(12) United States Patent
Nawaz et al.

(10) Patent No.: US 9,137,631 B2
(45) Date of Patent: Sep. 15, 2015

(54) LOCATION-BASED SERVICE PROVIDER METHOD AND SYSTEM HAVING A USER CONTROLLED LOCATION PRIVACY MECHANISM

(71) Applicant: Pitney Bowes Inc., Stamford, CT (US)

(72) Inventors: Yassir Nawaz, Hamden, CT (US); Jun Zhang, Hamden, CT (US); Christian A Geske, Riverside, CT (US)

(73) Assignee: Pitney Bowes Inc., Stamford, CT (US)

( * ) Notice: Subject to any disclaimer, the term of this patent is extended or adjusted under 35 U.S.C. 154(b) by 246 days.

(21) Appl. No.: 13/727,955

(22) Filed: Dec. 27, 2012

(65) Prior Publication Data

US 2014/0187266 A1    Jul. 3, 2014

(51) Int. Cl.
    *H04W 24/00*    (2009.01)
    *H04W 4/02*     (2009.01)
    *H04W 12/02*    (2009.01)

(52) U.S. Cl.
    CPC ............... *H04W 4/02* (2013.01); *H04W 12/02* (2013.01)

(58) Field of Classification Search
    CPC .......... H04M 1/72572; H04M 3/436–3/42348; H04M 15/48; H04M 2245/0156; H04W 4/02
    See application file for complete search history.

(56) References Cited

U.S. PATENT DOCUMENTS

| | | | |
|---|---|---|---|
| 7,386,318 B2 | 6/2008 | Moon | |
| 8,090,357 B2 * | 1/2012 | Steel | 455/414.2 |
| 8,185,131 B2 | 5/2012 | Wood | |
| 8,315,599 B2 | 11/2012 | Kasad | |
| 8,316,031 B2 | 11/2012 | Ramer | |
| 2007/0270165 A1 | 11/2007 | Poosala | |
| 2010/0014676 A1 * | 1/2010 | McCarthy et al. | 380/277 |
| 2010/0146091 A1 * | 6/2010 | Curtis et al. | 709/223 |
| 2011/0053614 A1 * | 3/2011 | Mishina et al. | 455/456.6 |

FOREIGN PATENT DOCUMENTS

WO    2006046845 A1    5/2006

OTHER PUBLICATIONS

Emmanouil Magkos, Cryptographic Approaches for Privacy Preservation in Location-Based Services, International Journal of Information Technologies and Systems Approach, Jun. 1, 2011, pp. 48-69. XPO55095980. ISSN: 1935-57OX.

* cited by examiner

*Primary Examiner* — Keith Fang
(74) *Attorney, Agent, or Firm* — Brian A. Lemm; Charles R. Malandra, Jr.; Steven J. Shapiro

(57) ABSTRACT

Methods and systems that allow a user to receive location-based services for user selected businesses while maintaining the privacy of his/her location when not in the vicinity of a user selected business. A user designates selected businesses to the LBS provider. The user's mobile device sends its location, in encrypted form, to the LBS provider. The LBS provider performs a computation on the encrypted location and returns an encrypted result to the user's mobile device. The user's mobile device decrypts the result and determines whether the user is near any selected businesses based on the decrypted result. Only if the decrypted result indicates the user is near an approved location will the users mobile device return its location, in an unencrypted form, to the LBS provider. Thus, the LBS provider will only know the user's location if and only if the use is near a business selected by the user.

9 Claims, 3 Drawing Sheets

LOCATION-BASED SERVICE PROVIDER METHOD AND SYSTEM HAVING A USER CONTROLLED LOCATION PRIVACY MECHANISM

FIELD OF THE INVENTION

The invention disclosed herein relates generally to location-based service provider systems, and more particularly to a location-based service provider methods and system in which the user can control when the location-based service provider can determine the user's location.

BACKGROUND OF THE INVENTION

In today's highly competitive business world, advertising to customers, both potential and previous, is a necessity. Businesses are always looking for ways to increase revenue, and increasing its sales to customers through advertising plays a large part in many business's plans for growth. Advertising has shown to be an effective method to inform, persuade or remind target buyers of the business's goods, services or goodwill, with the ultimate goal being that an advertisement will result in the sale of the goods or services. Studies have confirmed that the more that an advertisement can be made relevant and timely for a particular intended recipient, the more likely that it is to be successful. Location-based service (LBS) providers allow a business to provide a location-based service, e.g., coupon, advertisements, brochures, information, etc., to potential customers that are both timely and relevant. For example, a smart-phone (or other networked mobile device) user may register with the LBS provider to be provided with a service when the user is in the proximity of a selected business. This requires that the LBS provider be able to determine the location of the user. Typically this is done in one of two ways. The user's device can continually broadcast his/her location to the LBS provider or can use his/her device to manually check in and search for nearby selected businesses. The first solution is flawed because it offers no location privacy for the user. The LBS provider continually receives the user's location, even when the user is nowhere near a selected business. The user is required to place great trust in the LBS provider; if the user does not want to be constantly tracked by the LBS provider, he/she will not sign up for the service.

The second solution is also less than ideal because it requires the user to actively send his/her location and search for nearby approved locations. This requires work on the part of the user. If the user does not check in frequently, the user may miss out on desired location-based services. Additionally, the LBS provider would receive a user's location only sporadically when the user inputs his/her location. A business that wants to advertise using the LBS provider may determine that it is not worth the fees imposed by the LBS provider if large numbers of potential customers are missed.

Another possible solution is for the user to download all locations of interest, e.g., all locations of a selected business, from the LBS provider to his/her mobile device. This allows the user to automatically figure out that he/she is near a selected business location without broadcasting his/her location. However the problem with this solution is that it requires more computation on the mobile device, and reveals the LBS provider's database contents of business locations to the user, thereby preventing the LBS provider from offering an ongoing service.

SUMMARY OF THE INVENTION

The present invention alleviates the problems described above and provides methods and systems that allow a user to receive location-based services for user selected businesses while maintaining the privacy of his/her location when not in the vicinity of a user selected business. Thus, the LBS provider will know the user's location if and only if the user is near a business selected by the user. If the user is in an area where there are no user selected businesses, the users location will be protected from the LBS provider. In addition no manual input on the user's side is required, and the user will automatically receive location-based services when near a user selected business. The solution also keeps the heavy computation on the LBS provider side and preserves the privacy of the LBS provider database allowing it to offer an ongoing service.

In accordance with embodiments of the present invention, a user designates selected businesses, also referred to as approved locations, to the LBS provider. The LBS provider maintains a database of business locations. The user's mobile device sends its location, in encrypted form, to the LBS provider. The LBS provider performs a computation on the encrypted location and returns an encrypted result to the user's mobile device. The user's mobile device decrypts the result and determines whether the user is near any selected businesses based on the decrypted result. Only if the decrypted result indicates the user is near an approved location will the user's mobile device return its location, in an unencrypted form, to the LBS provider. The LBS provider can then return a location-based service, e.g., electronic coupon, advertisement, or the like, to the user's mobile device or forward the user's location to a participating company which sends the location-based service to the user. If the decrypted result indicates the user is not near an approved location, the user's device will not provide its location to the LBS provider and its current location is kept secure. Thus, the LBS provider will only know the user's location if and only if the user is near a business selected by the user.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like of corresponding parts.

DETAILED DESCRIPTION OF THE PRESENT INVENTION

Figure 1:
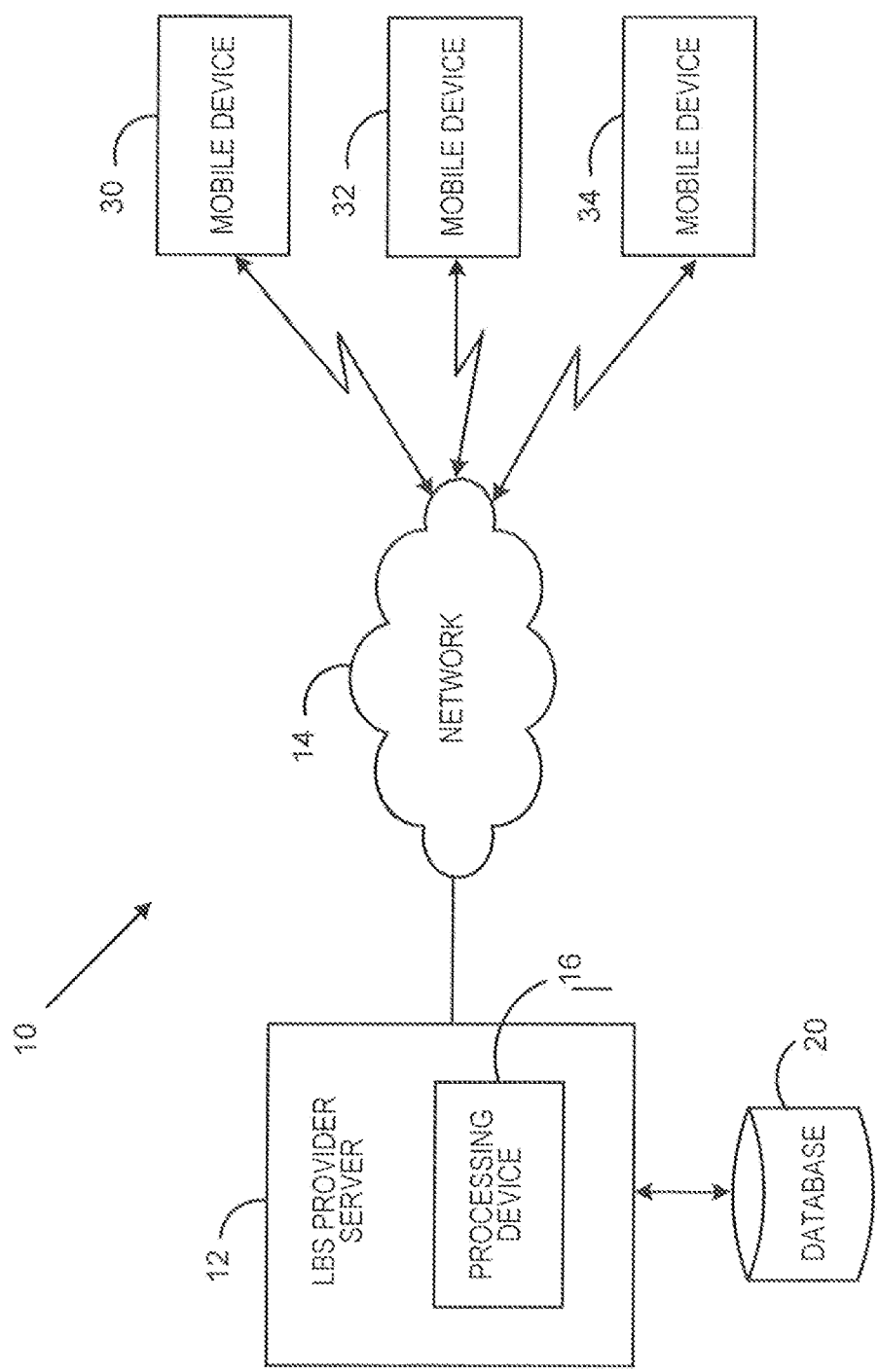
FIG. 1 illustrates in block diagram form a system according to an embodiment of the present invention.

In describing the present invention, reference is made to the drawings, wherein there is seen in FIG. 1 a block diagram of a system 10 in which the present invention can be implemented. System 10 includes a server 12 operated by a location based service provider that is coupled to a communication network 14, such as, for example, a wireless cellular communication network. Server 12 may be a mainframe or the like that includes at least one processing device 16. Server 12 may be specially constructed for the required purposes, or it may comprise a general purpose computer selectively activated or reconfigured by a computer program (described further below) stored therein. Such a computer program may alternatively be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, which are executable by the processing device 16. One of ordinary skill in the art would be familiar with the general components of a server system upon which the method of the present invention may be performed. Server 12 can communicate with one or more users operating one or more mobile devices 30, 32, 34 via the network 14. Mobile devices 30, 32, 34 can include, for example, smart-phones, tablets, personal data assistants, or any other type of electronic device that has network capability and can allow a user to access the network 14 to send and receive data from any other device capable of accessing the network 14. It should be understood that while three devices 30, 32, 34 are illustrated in FIG. 1, there is no limit to the number of devices and/or users of such devices. Each mobile device 30, 32, 34 is provided with one or more processing devices (not shown) that controls the operation and functions of the mobile device.

System 10 also includes a database 20 that is in electronic communication with the server 12. Database 20 stores locations for one or more businesses that have registered with the LBS provider. The present solution utilizes a spatial grid structure having a plurality of cells to quantize and index locations. A grid can be defined in many ways, provided that each location with a given latitude/longitude is associated with a unique cell of the grid. For example, the United States can be divided in many 100×100 meter cells that are each associated with a unique identifier. Any building in the United States will be located within one of these cells. It should be understood, of course, that the cell size need not be limited to the example provided above, and could be any size as desired. The specific cell into which a specific location falls can be determined, for example, using known geocoding technology. Thus, each location of a business will be associated with a unique cell of the grid. Database 20 stores a table that associates each location of a business with a grid cell based on the identifier of the cell. The defined grid is also accessible by mobile devices, e.g., mobile devices 30, 32, 34, such that each device is able to determine in which cell of the grid it is currently located (as described further below). Additionally, database 20 stores one or more advertisements provided by the businesses that have registered with the LBS provider for sending to potential customers as described further below.

Figure 2:
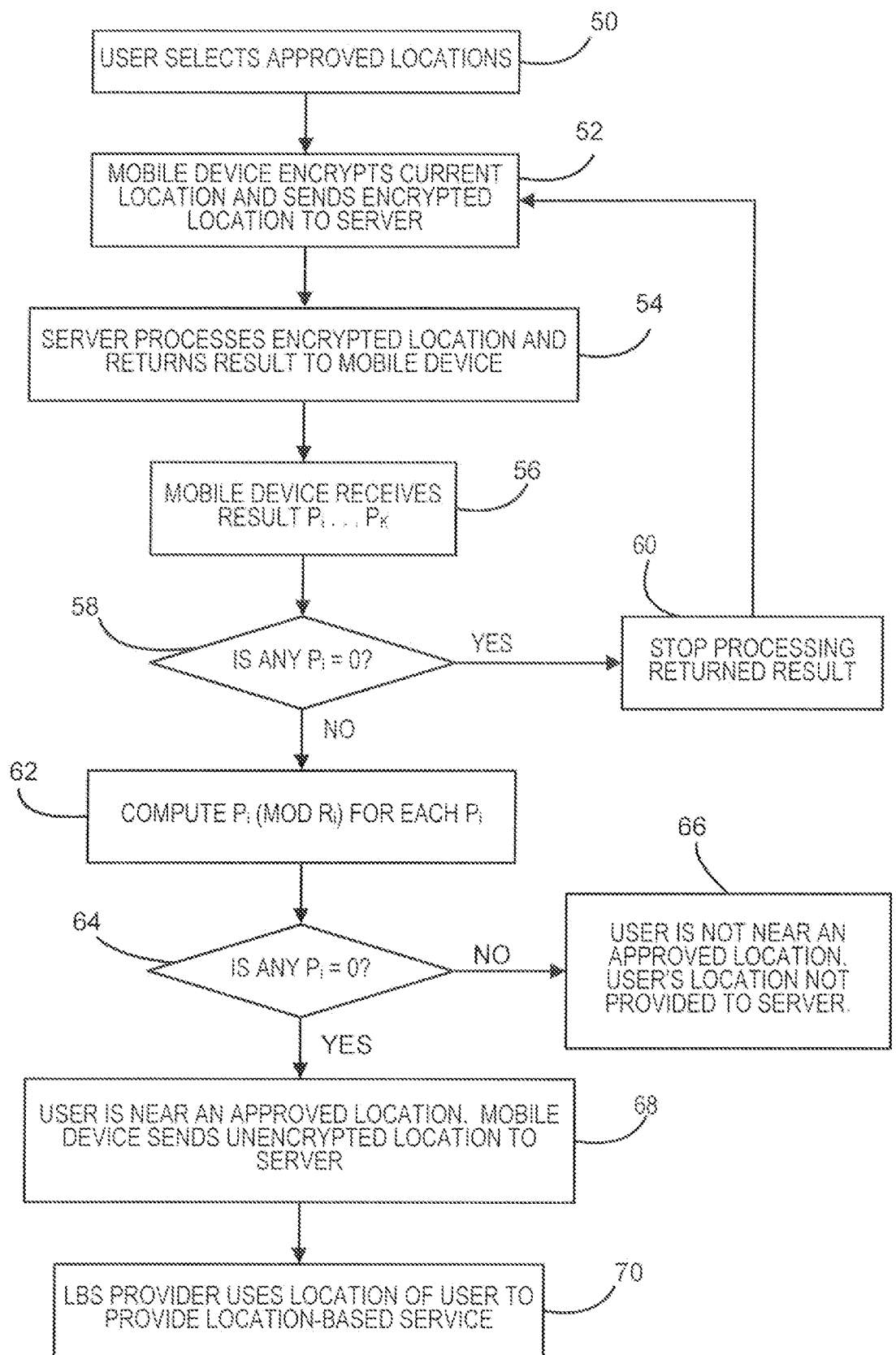
FIG. 2 illustrates in flow diagram form the processing performed according to an embodiment of the present invention.

FIG. 2 is a flowchart that illustrates an example of the operation of the system 10 shown in FIG. 1 according to an embodiment of the present invention. In step 50, when a user of a mobile device, e.g., mobile device 30, desires to receive location-based services from the LBS provider, the user will register with the LBS provider and provide the server 12 with one or more "approved locations." An approved location is a location which the user desires to receive a location-based service, e.g., electronic coupon, offering, advertisement, etc., via a mobile device when the user is physically near such a location. An approved location can be as specific as a particular business by name, e.g., Starbucks, or as general as a business type, e.g., retail clothing stores, shopping malls, etc., or refer simply to a physical location, e.g., a town or city. The processing device 16 will utilize the information stored in the database 20 to determine the grid cell identifier in which each of an approved location, e.g., store, town, etc., is located for the approved locations provided by the user. This information is then stored in the database 20 in association with the user. Thus, the database 20 will have a listing of all approved locations for a user, along with the grid cell in which an approved location is located.

Once a user has registered with the LBS provider, the user can operate a mobile device 30 to obtain desired location-based services without having to divulge its current location unless the user is near an approved location. In step 52, the user's mobile device 30 determines its location, using any known technology such as GPS technology or triangulation, and associates its current location with a grid cell identifier (described above). Mobile device 30 will then encrypt the user's current location, and provide the encrypted location to the LBS provider server 12. Encryption of the user's current location by the mobile device 30 can be performed as follows. As described, the processor of the mobile device 30 determines its location and associates it with a grid cell identifier x. The processor of the mobile device 30 then generates k random values $r_1 \ldots r_k$, and adds location x to each of the random values $r_1 \ldots r_k$ to get k values $s_1 \ldots s_k$. These values represent the user's location in encrypted form, which are sent to the server 12. Because the location x is encrypted by combining it with the random values, the values of s look like a random number to the server 12, thereby preventing the server 12 from determining the location x of the user. Optionally, to limit the amount of computation that the server 12 has to perform, the mobile device 30 can also send to the server 12 a cloaking region, which could be, for example, a large area such as a state. If a cloaking region is provided, the server 12 will only test the locations from its database, as described below, which are in the cloaking region instead of every location. Thus, while the LBS provider may know that a user is in a particular region, which is a very large area, it will not know, at this time, the actual location within the region. Because the location is provided only in encrypted form, the user's mobile device 30 can continually broadcast its location to the LBS provider server 12 without the user having to worry about the LBS provider constantly tracking his/her location, even in areas where there are no approved locations. Alternatively, the user's mobile device 30 can automatically initiate a broadcast of its location (in encrypted format as described above) according to a specified time interval, e.g., every five minutes, or the user can manually operate the mobile device 30 to initiate a broadcast of its location (in encrypted format as described above) to the server 12. If the location broadcast is continuous or automatically initiated, the amount of communication necessary can be reduced by not sending or initiating the location broadcast if the user's location has not changed, i.e., the user is still located in the same grid cell as the previously sent location broadcast.

In step 54, upon receiving the user's encrypted location (and optional cloaking region), the processing device 16 of the server 12 will process this information and provide an encrypted result back to the mobile device 30. Processing of the received information can be performed as follows. Recall that database 20 stores a listing of all approved locations for a user, along with the grid cell in which an approved location is located. The processing device 16 will retrieve each grid cell identifiers $y_1 \ldots y_m$ in which an approved location is located within the region (if provided). For example, if an approved location is Starbucks stores and the cloaking region is the state of Connecticut, this may be the set of grid cells in Connecticut in which a Starbucks is located. If no cloaking region is provided, then every grid cell identifier in which an approved location for that user is located will have to be retrieved. The processing device 18 divides this set of m locations into k subsets $Y_1 \ldots Y_k$. For every subset $Y_j$, processing device 16 performs the following computation. It takes each location $y_i$ in that subset $Y_j$ and subtracts it from corresponding $s_i$ to get $d_i$. It then computes the product of all $d_i$'s to get $p_i$. The processing device 16 repeats this process for all subsets $Y_1 \ldots Y_k$ to obtain $p_1 \ldots p_k$. These values represent an encrypted result, which are returned to the mobile device 30. It is possible that the random values selected by the mobile device 30 will result in a value for one or more $d_i$ to be equal to zero, resulting in $p_i$ being zero, regardless of location of the mobile device 30. To reduce the amount of communications between the server 12 and mobile device 30 in such situations where any of the values $p_1 \ldots p_k$ are zero, the server 12 in step 54 can optionally not return such results to the mobile device 30 and instead discard the results and ask the user to send encrypted location again computed with different random values.

In step 56 the mobile device 30 receives the encrypted result from the server 12. In step 58, the processor of the mobile device 30 processes the returned result by first determining if any $p_i$ is zero (unless the processing performed by the server 12 in step 54 discarded such results instead of sending them to the mobile device 30). If any $p_i$ is zero, then in step 60 the mobile device 30 will stop processing the returned result, since this means that the random values selected are not appropriate as described above. Preferably, the process can return to step 52 and the mobile device 30 can encrypt its current location using new random values $r_1 \ldots r_k$ and repeat the processing from that point. If all $p_i$ are non-zero in step 58, then in step 62 the processor of the mobile device will compute, for each $p_i$, $p_i$ (mod $r_i$). In step 64, it is determined if any resulting $p_i$ from the computation performed in step 62 is zero. If in step 64 it is determined that there is no $p_i$ that is equal to zero, then this means that the mobile device 30, and hence the user, is not near an approved location, and in step 66 the mobile device will not send its location to the server 12. However, if in step 64 it is determined that there is a $p_i$ that is equal to zero, then this means that the mobile device 30, and hence the user, is in the same grid cell as an approved location. More specifically, as illustrated by the following equation:

$$p_i(\text{mod } \eta) \equiv \prod_{j=1}^{n} d_j(\text{mod } \eta) \equiv \prod_{j=1}^{n} (s_i - y_j)(\text{mod } \eta) \equiv$$
$$\prod_{j=1}^{n} (x + \eta - y_j) \text{ (mod } \eta) \equiv \prod_{i=1}^{m} (x - y_j) \text{ (mod } \eta)$$

is equal to zero if one of the $(x-y_j)$ are zero, indicating the user is in the same grid cell identifier (x) as an approved location $(y_j)$. In step 68, the mobile device 30 will send its location, using the grid cell identifier x in an unencrypted form, to the server 12. Thus, the LBS provider (server 12) will not learn of the location of the user (mobile device 30) unless the user is close to a user approved location, i.e., within the same grid cell identifier as an approved location. It should be understood that the definition of "close" to a user approved location can be adjustable and is not limited to being within the same grid cell as an approved location, but instead can be expanded to include a group of grid cells. For example, when a user provides approved locations (step 50) and the processing device 16 of the server 12 utilizes the information stored in the database 20 to determine the grid cell identifier in which each of an approved location is located, the processing device 16 can expand the number of cells that constitute an approved location by including all cells adjacent to a cell in which an approved location is located. Thus, an approved location could encompass a group of cells instead of just the single cell in which a business is located. The processing device 16 will utilize all of the grid cell identifiers for the group of cells when performing the processing as described above with respect to step 54.

Once the LBS provider server 12 has the location of the mobile device 30, then in step 70 the LBS provider can use the location to provide the user with a location-based service. For example the server 12 can retrieve one or more advertisements stored in the database 20 and send it to the user's mobile device 30. Alternatively, the LBS provider can choose not to return its own location-based service to the user but to share the location x of the user with any participating companies. A participating company can then choose to directly return a location-based service (e.g., an electronic coupon) to the user, or can choose to forward a specific location based service to the LBS provider server 12 which then forwards it to the user. Other possibilities and combinations exist to provide the location-based service to the user once the users location is revealed, all of which may be used with the present invention. Preferably, when the mobile device 30 sends its location to the server 12 in unencrypted form, it will also create a log of the revealed location along with the time and random numbers used and store them locally. This information can be used to check that the LBS provider is not improperly trying to violate a users privacy by testing grid cells that are not occupied by a user approved location. The user can occasionally check this log to see which locations have been sent to the server 12, and if one of the revealed locations is not among the user's approved locations, the user will know that the LBS provider is violating its agreement and can drop the service.

Figure 3:
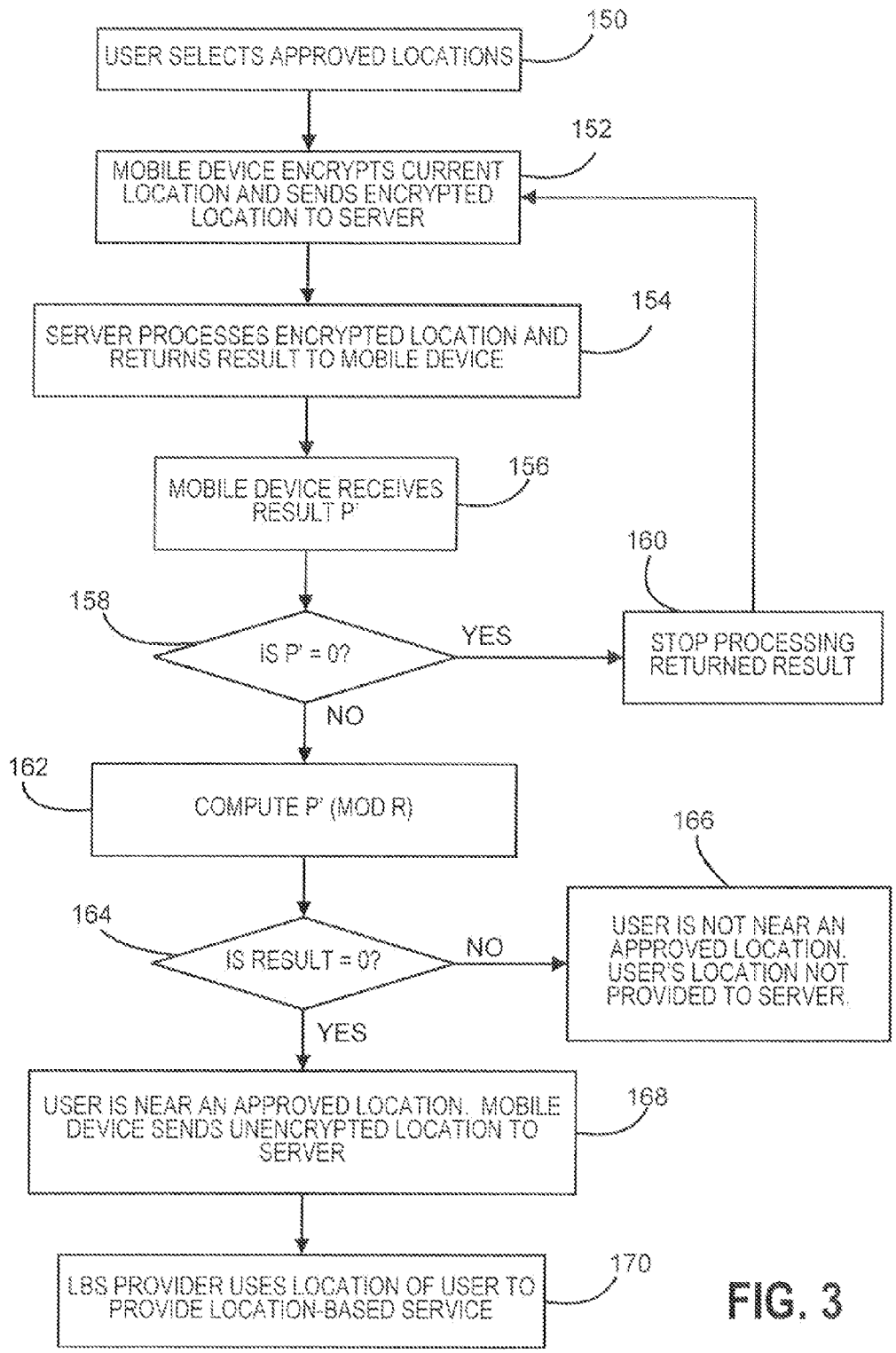
FIG. 3 illustrates in flow diagram form the processing performed according to another embodiment of the present invention.

FIG. 3 is a flowchart that illustrates an example of the operation of the system 10 shown in FIG. 1 according to another embodiment of the present invention. In step 150, the user registers with the LBS provider and provides the server 12 with one or more "approved locations" similarly as described with respect to step 50 of FIG. 2. In step 152, the user's mobile device 30 determines its location, using any known technology such as GPS technology or triangulation, and associates its current location with a grid cell identifier (described above). Mobile device 30 will then encrypt the user's current location, and provide the encrypted location to the LBS provider server 12. Encryption of the users current location by the mobile device 30 can be performed as follows. As described, the processor of the mobile device 30 determines its location and associates it with a grid cell identifier x. The processor of the mobile device 30 then generates three random value r, $k_1$ and $k_2$, and computes the sum of x with the product of r and $k_1$ to get t (t=x+r$k_1$). The processor then computes the product of r and $k_2$ to get s (s=r$k_2$). These values (t, s) represent the user's location in encrypted form, which are sent to the server 12. Because the location x is encrypted by combining it with the products of r and $k_1$, thereby making the value of t look like a random number to the server 12, the server 12 is prevented from determining the location x of the user. Optionally, to limit the amount of computation that the server 12 has to perform, the mobile device 30 can also send to the server 12 a cloaking region as described above with respect to FIG. 2. The initiation and timing of the mobile device 30 communicating this information to the server 12 can be the same as described above with respect to FIG. 2.

In step 154, upon receiving the user's encrypted location (and optional cloaking region), the processing device 16 of the server 12 will process this information and provide an encrypted result back to the mobile device 30. Processing of the received information can be performed as follows. Recall that database 20 stores a listing of all approved locations for a user, along with the grid cell in which an approved location is located. The processing device 16 will retrieve each grid cell identifiers $y_i \ldots y_m$ in which an approved location is located within the region (if provided). The processing device 16 computes the difference of t and $y_i$ for each i to get the values $d_1 \ldots d_m$. The processing device then computes p, the product of all $d_i$. The processing device 16 then computes p(mod s) to get the value p'. This value represents an encrypted result, which is returned to the mobile device 30. It is possible that the random values selected by the mobile device 30 will result in a value for one or more $d_j$ to be equal to zero, resulting in p and thus p' being zero, regardless of location of the mobile device 30. To reduce the amount of communications between the server 12 and mobile device 30 in such situations where the value of p' is zero, the server 12 in step 154 can optionally not return such result to the mobile device 30 and instead discard the result and ask the user to send encrypted location again computed with different random values.

In step 156 the mobile device 30 receives the encrypted result from the server 12. In step 158, the processor of the mobile device 30 processes the returned result by first determining if p' is zero (unless the processing performed by the server 12 in step 154 discarded such result instead of sending them to the mobile device 30). If p' is zero, then in step 160 the mobile device 30 will stop processing the returned result, since this means that the random values selected are not appropriate as described above. Preferably, the process can return to step 152 and the mobile device 30 can encrypt its current location using new random values r, $k_1$, $k_2$ and repeat the processing from that point. If p' is not zero in step 158, then in step 162 the processor of the mobile device 30 will compute p'(mod r). In step 164, it is determined if the result from the computation performed in step 162 is zero. If in step 164 it is determined that the result is not zero, then this means that the mobile device 30, and hence the user, is not near an approved location, and in step 166 the mobile device will not send its location to the server 12. However, if in step 164 it is determined that the result is equal to zero, then this means that the mobile device 30, and hence the user, is in the same grid cell as an approved location. More specifically, as illustrated by the following equation:

$$p'(\bmod r) \equiv (\Pi_{i=1}^{m} d_i (\bmod rk_2))(\bmod r) \equiv \Pi_{i=1}^{m} d_i (\bmod r) \equiv \Pi_{i=1}^{m} (t - y_i)(\bmod r) \equiv \Pi_{i=1}^{m} (x + rk_2 - y_i)(\bmod r) \equiv \Pi_{i=1}^{m} (x - y_i)(\bmod r)$$

is equal to zero if one of the $(x-y_i)$ is zero, indicating the user is in the same grid cell identifier (x) as an approved location $(y_i)$. In step 168, the mobile device will send its location, using the grid cell identifier x in an unencrypted form, to the server 12. Thus, the LBS provider (server 12) will not learn of the location of the user (mobile device 30) unless the user is close to a user approved location, within the same grid cell identifier as an approved location. It should be understood that the definition of "close" to a user approved location can be adjustable and is not limited to being within the same grid cell as an approved location, but instead can be expanded to include a group of grid cells as described above with respect to FIG. 2.

Once the LBS provider server 12 has the location of the mobile device 30, then in step 170 the LBS provider can use the location to provide the user with a location-based service similarly as described above with respect to FIG. 2. Preferably, when the mobile device 30 sends its location to the server 12 in unencrypted form, it will also create a log of the revealed location along with the time and random numbers used and store them locally. This information can be used to check that the LBS provider is not improperly trying to violate a user's privacy by testing grid cells that are not occupied by a user approved location. The user can occasionally check this log to see which locations have been sent to the server 12, and if one of the revealed locations is not among the user's approved locations, the user will know that the LBS provider is violating its agreement and can drop the service.

Thus, as described above, the user of a mobile device 30 can receive location based services without having to constantly divulge his/her location to the LBS provider except for those instances in which the user is near a user approved location. In the description provided above, the LBS provider manages the user's location privacy preferences and the underlying grid structure. It should be understood that the present invention is not so limited and a third party provider can be used for these processes and act as an intermediary between a user and various LBS providers that the user has engaged.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a providing a location based service to a user operating a mobile device, the method comprising:
   receiving, by a server, a current location of the mobile device in encrypted form;
   processing, by the server, the current location of the mobile device in encrypted form, the processing utilizing at least one previously designated use approved location, for which the user desires to receive a location based service, that is stored in a database accessible by the server, to produce a result without having to decrypt the current location of the mobile device;
   sending, by the server, the result to the mobile device for processing by the mobile device;
   receiving, by the server, the current location of the mobile device from the mobile device in unencrypted form only when the mobile device determines that its current location is near a user approved location based on the result returned to the mobile device; and
   using the current location of the mobile device to provide a location based service to the user operating the mobile device.

2. The method of claim 1, wherein the current location of the mobile device in encrypted form is based on a unique identifier of a grid cell in which the mobile device is located combined with a random value.

3. The method of claim 1, further comprising:
   receiving, by the server, a cloaking region along with the current location of the mobile device in encrypted form;
   wherein the processing performed by the server utilizes only user approved locations within the cloaking region.

4. The method of claim 1, wherein the location-based service includes at least one of an electronic coupon and advertisement.

5. A method for a user to receive a location-based service on a mobile device, the method comprising:
   determining, by the mobile device, a current location based on a grid cell identifier;

combining, by the mobile device, the grid cell identifier with a random number to produce a current location of the mobile device in encrypted form;
sending, by the mobile device, the current location of the mobile device in encrypted form to a server;
processing, by the server, the current location of the mobile device in encrypted form, the processing utilizing at least one previously designated user approved location, for which the user desires to receive a location based service, that is stored in a database accessible by the server, to produce a result without having to decrypt the current location of the mobile device;
sending, by the server, the result to the mobile device;
processing, by the mobile device, the result to determine that the mobile device is near a user approved location;
sending, by the mobile device the current location in unencrypted form to the server; and
using the current location of the mobile device to provide a location based service to the user on the mobile device.

6. The method of claim 5, further comprising:
sending to the server, by the mobile device, a cloaking region along with the current location of the mobile device in encrypted form;
wherein the processing performed by the server utilizes only user approved locations within the cloaking region.

7. The method of claim 5, wherein the location-based service includes at least one of an electronic coupon and advertisement.

8. A system for providing location-based services, the system comprising:
a mobile device adapted to determine a current location based on a grid cell identifier, combine the grid cell identifier with a random number to produce a current location of the mobile device in encrypted form, and transmit the current location of the mobile device in encrypted form; and
a server adapted to receive the current location of the mobile device in encrypted form, process the current location of the mobile device in encrypted form utilizing at least one previously designated user approved location, for which the user desires to receive a location based service, that is stored in a database accessible by the server, to produce a result without having to decrypt the current location of the mobile device, and send the result to the mobile device;
the mobile device being further adapted to process the result to determine that the mobile device is near a user approved location and send the current location of the mobile device in unencrypted form to the server,
wherein the server is further adapted to use the current location of the mobile device to provide a location based service to the mobile device.

9. The system of claim 8, wherein the location-based service includes at least one of an electronic coupon and advertisement.

\* \* \* \* \*